United States Patent [19]
Clark et al.

[11] 3,912,908

[45] Oct. 14, 1975

[54] ELECTRIC CARTRIDGE-TYPE HEATER FOR PRODUCING A GIVEN NON-UNIFORM AXIAL POWER DISTRIBUTION

[75] Inventors: David L. Clark, Knoxville; Tommy S. Kress, Oak Ridge, both of Tenn.

[73] Assignee: The United States of America as represented by the United States Energy Research and Development Administration, Washington, D.C.

[22] Filed: Nov. 12, 1974

[21] Appl. No.: 523,183

[52] U.S. Cl. ............... 219/553; 338/218; 338/302
[51] Int. Cl.² ............................................. H05B 3/10
[58] Field of Search ........... 219/523, 535, 552, 553; 338/141, 216, 217, 218, 300, 302, 308, 309; 13/22, 25, 31

[56] References Cited
UNITED STATES PATENTS

| | | | |
|---|---|---|---|
| 1,318,028 | 10/1919 | Thomson | 338/217 |
| 1,881,444 | 10/1932 | Flanzer | 338/300 X |
| 2,371,696 | 3/1945 | Levitt | 338/218 X |
| 2,838,639 | 6/1958 | Planer et al. | 338/218 X |
| 2,910,664 | 10/1959 | Lanning | 338/300 |
| 3,289,139 | 11/1966 | Hyde | 338/218 |
| 3,336,431 | 8/1967 | Biddulph | 13/25 |
| 3,345,597 | 10/1967 | Schrewelius et al. | 338/302 |

FOREIGN PATENTS OR APPLICATIONS

| | | | |
|---|---|---|---|
| 921,934 | 1/1947 | France | 338/218 |

*Primary Examiner*—Volodymyr Y. Mayewsky
*Attorney, Agent, or Firm*—Dean E. Carlson; David S. Zachry; Louis M. Decklemann

[57] ABSTRACT

An electric cartridge heater is provided to simulate a reactor fuel element for use in safety and thermal-hydraulic tests of model nuclear reactor systems. The electric heat-generating element of the cartridge heater consists of a specifically shaped strip of metal cut with variable width from a flat sheet of the element material. When spirally wrapped around a mandrel, the strip produces a coiled element of the desired length and diameter. The coiled element is particularly characterized by an electrical resistance that varies along its length due to variations in strip width. Thus, the cartridge heater is constructed such that it will produce a more realistic simulation of the actual nonuniform (approximately "chopped" cosine) power distribution of a reactor fuel element.

1 Claim, 3 Drawing Figures

ELECTRIC CARTRIDGE-TYPE HEATER FOR PRODUCING A GIVEN NON-UNIFORM AXIAL POWER DISTRIBUTION

BACKGROUND OF THE INVENTION

This invention was made in the course of, or under, a contract with the United States Atomic Energy Commission.

Electric cartridge heaters are used extensively to simulate reactor fuel elements in safety and thermal-hydraulic tests of model nuclear reactor systems. These heaters generally have uniform heat generation rates along their length whereas the axial power distributions in nuclear reactors are nonuniform. It is desirable, therefore, that an electric cartridge heater be provided that can match a given nonuniform power distribution and thereby obtain a more realistic simulation of actual reactor fuel element behavior.

The closest prior techniques for producing nonuniform power distributions in electrical cartridge heaters consists of (a) machining or combining tubes to give a variable thickness and (b) winding of coiled wires or ribbon elements of constant cross section with variable spacing. However, neither of the above techniques is suitable as a general method of fabricating desired variable power distribution heaters. The present invention was conceived to provide such desired heaters in a manner to be described hereinbelow.

SUMMARY OF THE INVENTION

It is the object of the present invention to provide an electric cartridge heater wherein the heater can be utilized to simulate a reactor fuel element in safety and thermal-hydraulic tests of model nuclear reactor systems.

The above object has been accomplished in the present invention by utilizing a heat-generation element consisting of a specifically-shaped strip of metal cut with a variable width from a flat sheet of the element material by varying the cut angle from the vertical coordinate such that when the strip is spirally wrapped around a mandrel, the strip produces a coiled element of the desired length and diameter with an electrical resistance that varies along its length due to the variations in width of the ribbon. The variation in resistance is designed so that the desired heat flux distribution is closely approximated.

DESCRIPTION OF THE PREFERRED EMBODIMENTS

Figure 1:
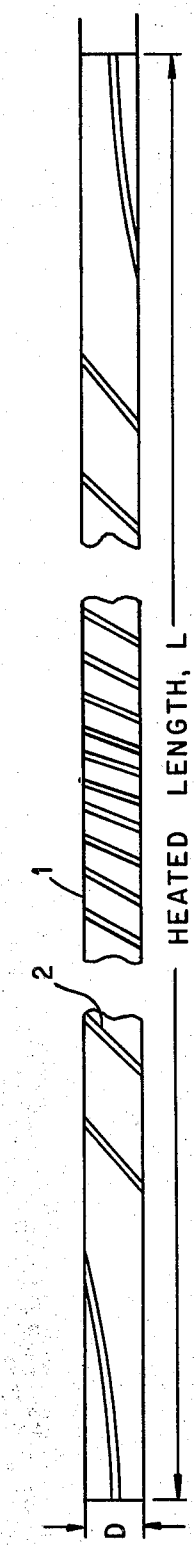
FIG. 1 is an illustration of a coiled heater element of the present invention.
Figure 2:
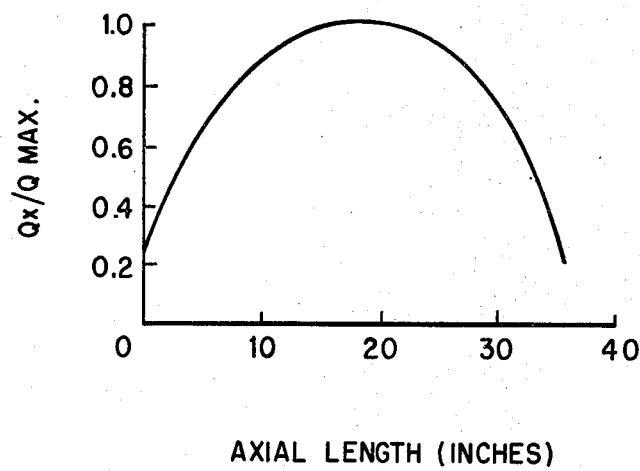
FIG. 2 is a graph showing the nonuniform axial power distribution of a typical reactor fuel element.

The cartridge heater of the present invention is illustrated in FIG. 1 of the drawings wherein a metal strip 1 having a variable width is spirally wrapped around a mandrel having a diameter D and a length L. A gap 2 is provided between the spirals of the strip 1. It should be understood that the heater of FIG. 1 is provided with a conventional housing enclosing the heating unit and insulated therefrom in a conventional manner. Also, in FIG. 1 the metal strip 1 is provided with suitable conventional electrical end terminals, not shown, connected thereto at each end thereof. The electrical resistance of the strip 1 varies along its length due to the variations in the width thereof. The variation in resistance is designed so that the desired heat flux distribution is closely approximated to the desired power distribution that is illustrated in FIG. 2 of the drawings.

Figure 3:
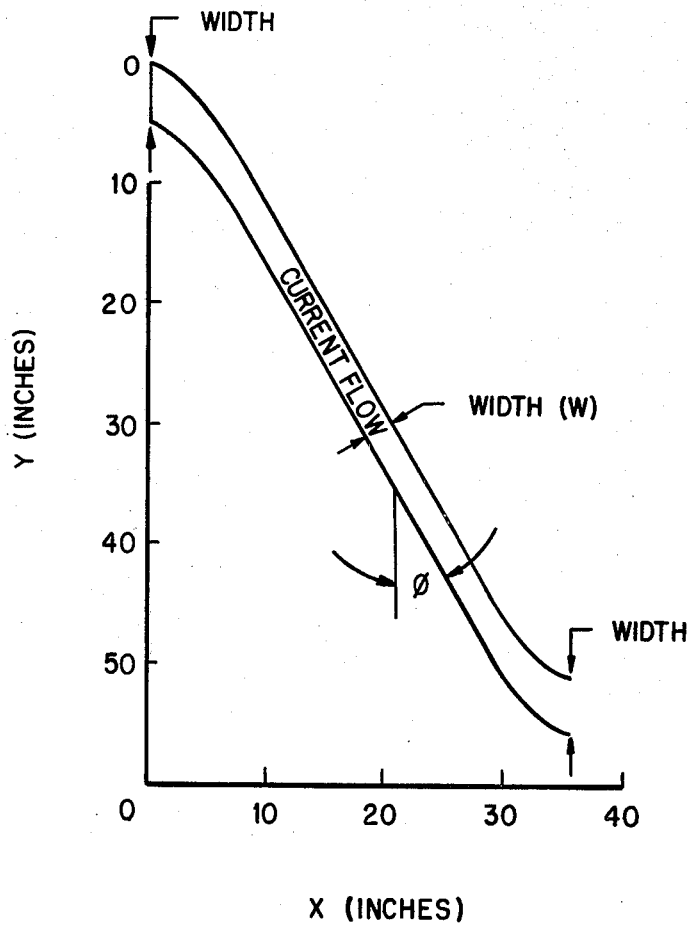
FIG. 3 is a drawing of the "uncoiled" strip contour that will give the indicated power distribution when the strip is spirally wrapped around a mandrel to become the cartridge heater element.

The one essential feature of the present invention is that the electric heat-generation element consists of a specifically-shaped strip of metal cut with variable width from a flat sheet of the element material. FIG. 3 illustrates a typical strip or ribbon contour shape which is not drawn to scale. The variations in width are produced by varying the cut angle, this angle being defined as the angle between one side of the strip and a vertical coordinate. When spirally wrapped around a mandrel, the strip or ribbon produces a coiled element of the desired length and diameter such as illustrated in FIG. 1.

The design of a strip profile to give a desired axial heat flux distribution can be established from the following relation:

The local power P, is given by $P = (I^2 \rho / W^2 T)$, (1)
P = power per unit area (local) I = electrical current
$\rho$ = material resistivity
W = strip width (local)
T = strip thickness
Solving equation (1) for the strip width gives $$W = \sqrt{\frac{I^2 \rho}{PT}} \quad (2)$$

with respect to some reference position that has power Po and width Wo, $$W = \sqrt{\frac{P_o}{P}} W_o \quad (3)$$

Equation (3) and the desired power distribution can be used to establish the relative width anywhere along the strip element. However, it is not sufficient to know just the width. To wrap a ribbon around a mandrel of constant diameter, D, allowance must be made for a gap between turns of the strip when coiled; otherwise the ribbon or strip will wrap over itself in the winding. With respect to the uncoiled strip shown in FIG. 3, the vertical component of the width of the strip is made constant and is given by $W_v = \pi D - G$, where G is the vertical, or Y, component of the gap between coils. For sake of simplicity, the thickness of the heater element strip is neglected, i.e., it is considered small in comparison with the mandrel outside diameter. In addition, to be conformable, the slope of the cut must be the same on each side of any vertical line (line in the Y-direction). The angle ($\theta$) of this slope with the vertical is given by $$W = (\pi D - G) \sin \theta$$

or, in terms of a reference angle, $\theta_o$ (at $P_o$, $W_o$)

$$\sin \theta = \sqrt{\frac{P_o}{P}} \sin \theta_o .$$

If the reference position is taken to be at one end of the heater strip where the power is designated as Po and the angle, $\theta_o$, is assumed to be 90°, then $$\sin \theta = \sqrt{\frac{P_o}{P}} \qquad (4)$$

As a practical example, suppose it is desired to make a heater element 36 inches long, with an inside diameter of 0.121 inch, that would give the power distribution shown in FIG. 2. If we let the gap between coils have a constant vertical component of 0.006 inch, the constant vertical component of the strip width will be $$W_v = \pi(0.121) - 0.006 = 0.374 \text{ inch.}$$

Using equation (4) and the desired power distribution curve (FIG. 2), the strip profile that results is shown in FIG. 3, wherein the actual width (W) of the strip varies from 0.374 inch at one end to 0.187 inch (in the center) to 0.374 inch at the other end. The thickness of the strip is determined by the available power supply, the desired peak heat flux, and the material electrical resistivity.

The electrical end terminals, not shown, of the cartridge heater of FIG. 1 are adapted to be connected to a power supply, not shown, such that when the heater is utilized to simulate a reactor fuel element in safety and thermal-hydraulic tests of model nuclear reactor systems, it will provide for a realistic simulation of the actual nonuniform (approximately "chopped" cosine) power distribution of a reactor fuel element.

This invention has been described by way of illustration rather than by limitation and it should be apparent that it is equally applicable in fields other than those described. The basic technique described above is suited for other uses where variable heat flux patterns are required and it can be extended to radiant, enclosed ceramic, and other types of heaters, for example.

What is claimed is:

1. An electric cartridge heater for simulating a reactor fuel element for use in safety and thermal-hydraulic tests of model nuclear reactor systems comprising a specifically-shaped strip of metal provided with a variable width, a mandrel, said strip of metal being spirally wrapped around said mandrel with a constant gap between the spirals and provided with electrical end terminals to thus provide a coiled heater element of a desired length and diameter with the width of said coiled heater element being the smallest in the center portion of its length and getting gradually wider toward each end thereof with the ends thereof having the greatest width, and a housing enclosing said coiled heater element and insulated therefrom, whereby said coiled element is characterized by an electrical resistance that varies along its length due to variations in strip width to provide a simulation of the nonuniform (chopped cosine) power distribution of a reactor fuel element when said heater is energized for a simulated test operation.

* * * * *